(12) United States Patent
Reso et al.

(10) Patent No.: US 9,349,194 B2
(45) Date of Patent: May 24, 2016

(54) METHOD FOR SUPERPIXEL LIFE CYCLE MANAGEMENT

(71) Applicant: THOMSON LICENSING, Issy de Moulineaux (FR)

(72) Inventors: Matthias Reso, Hannover (DE); Joern Jachalsky, Wennigsen (DE); Bodo Rosenhahn, Ronnenberg (DE)

(73) Assignee: THOMSON LICENSING, Issy-les Moulineaux (FR)

(*) Notice: Subject to any disclaimer, the term of this patent is extended or adjusted under 35 U.S.C. 154(b) by 0 days.

(21) Appl. No.: 14/811,760

(22) Filed: Jul. 28, 2015

(65) Prior Publication Data

US 2015/0332480 A1 Nov. 19, 2015

Related U.S. Application Data

(63) Continuation of application No. 14/076,638, filed on Nov. 11, 2013, now Pat. No. 9,105,109.

(30) Foreign Application Priority Data

Nov. 15, 2012 (EP) .................................... 12306418
Nov. 15, 2012 (EP) .................................... 12306419
Feb. 8, 2013 (EP) .................................... 13305157

(51) Int. Cl.
*G06T 7/40* (2006.01)
*G06T 7/00* (2006.01)

(52) U.S. Cl.
CPC ............. *G06T 7/408* (2013.01); *G06T 7/0081* (2013.01); *G06T 7/0097* (2013.01); *G06T 2207/10016* (2013.01); *G06T 2207/10024* (2013.01)

(58) Field of Classification Search
CPC ..... G06T 7/0081; G06T 7/0097; G06T 7/408; G06T 2207/10016; G06T 2207/10024
USPC .......... 382/173, 167, 180, 199; 345/474, 660, 345/591
See application file for complete search history.

(56) References Cited

U.S. PATENT DOCUMENTS

| 5,321,667 | A | 6/1994 | Audi et al. |
| 8,428,363 | B2 | 4/2013 | Tuzel et al. |
| 8,577,170 | B2* | 11/2013 | Omer ...................... G06T 5/008 348/94 |
| 8,712,154 | B2 | 4/2014 | Perbet et al. |
| 9,105,109 | B2* | 8/2015 | Reso ...................... G06T 7/408 |
| 2005/0163348 | A1 | 7/2005 | Chen |

(Continued)

OTHER PUBLICATIONS

Amelio Vazquez-Reina et al: "Multiple Hypothesis Video Segmentation from Superpi xe 1 Flows", Sep. 5, 2010, Computervision a ECCV 2010, Springer Berlin Heidelberg, Berlin, Heidelberg, p. 268-281, XP019150628, ISBN: 978-3-642-15554-3* abstract * * sections 2, 3, 4 * * figure 4(a) *.

(Continued)

*Primary Examiner* — Mekonen Bekele
(74) *Attorney, Agent, or Firm* — Robert D. Shedd; Patricia A. Verlangieri; Sebastien Aumonier (57) ABSTRACT

A method and an apparatus for life cycle management for superpixels associated to frames of a sequence of frames are described. An area occupied by a superpixel in a frame of the sequence of frames is monitored. In case the area of the superpixel becomes smaller than a specified first value, the superpixel is terminated in the later frame. In case the area of the superpixel becomes larger than a specified second value, the superpixel is split in the later frame.

12 Claims, 5 Drawing Sheets

(56) References Cited

U.S. PATENT DOCUMENTS

| | | | |
|---|---|---|---|
| 2006/0085129 | A1 | 4/2006 | Belenkii et al. |
| 2011/0176577 | A1* | 7/2011 | Bandara .................... G01J 3/36 374/121 |
| 2012/0075440 | A1 | 3/2012 | Ahuja et al. |
| 2012/0275702 | A1* | 11/2012 | Tuzel .................... G06T 7/0081 382/173 |
| 2013/0071016 | A1* | 3/2013 | Omer ...................... G06T 5/008 382/164 |
| 2013/0243307 | A1* | 9/2013 | Winter .................. G06T 7/0079 382/154 |
| 2013/0300750 | A1 | 11/2013 | Mishra et al. |
| 2013/0342559 | A1* | 12/2013 | Reso ........................ G09G 5/02 345/591 |
| 2014/0028727 | A1 | 1/2014 | Ragozin et al. |
| 2015/0332480 | A1* | 11/2015 | Reso ........................ G06T 7/408 382/167 |

OTHER PUBLICATIONS

Tinghuai Wang et al: "Multi-label propagation for •coherent videosegmentation and artistic stylization", International Conf. on Image Processing (ICIP 2010), USA, Sep. 26, 2010, pp. 3005-3008, XP031811016, ISBN: 978-1-4244-7992-4 * abstract ** section 2 *.

Collomosse J P et al: "Stroke Surfaces: Temporally Coherent Artistic Animations from Video", IEEE Transactions on Visualization Andcomputer Graphics, IEEE Service Center, Los Alamitos, CA, US,vo 1 . 11, No. 5 , Sep. 1, 2005, pp. 540-549, XP002470161, ISSN: 1077-2626, DOI: 10.1109/TVCG.2005.85 * section 2.

X. Ren et al.: "Learning a classification model for segmentation", IEEE International Conference on Computer Vision (ICCV) 2003, pp. 1-8.

O. Veksler et al.: "Superpixels and Supervoxels in an Energy Optimization Framework", Computer Science Department University of W. Ontario, pp. 1-14.

A. Levinshtein et al.: "Spatiotemporal Closure", in Computer Vision—ACCV 2010, vol. 6492, R. Kimmel et al., Eds. Springer Berlin / Heidelberg, 2011, pp. 1-14.

R. Achanta et al.: "SLIC superpixels compared to state-of-the-art superpixel methods", IEEE Transactions on Pattern Analysis and Machine Intelligence, vol. 34 (2012), pp. 2274-2281.

G. Zeng et al.: "Structure-sensitive superpixels via geodesic distance", 2011 IEEE International Conference on Computer Vision (ICCV), pp. 447-454.

A. Levinshtein, A. Stere, K. N. Kutulakos, D. J. Fleet, S. Dickinson, and K. Siddiqi, "TurboPixels: Fast Superpixels Using Geometric Flows," Pattern Analysis and Machine Intelligence, IEEE Transactions on, vol. 31, No. 12, pp. 2290-2297, May 8, 2009.

A. P. Moore, S. J. D. Prince, J. Warrell, U. Mohammed, and G. Jones, "Superpixel lattices," presented at the Computer Vision and Pattern Recognition (CVPR), 2008. IEEE Conference on, Jun. 23, 2008, pp. 1-8.

R. Achanta, A. Shaji, K. Smith, A. Lucchi, P. Fua, and S. Süsstrunk, "SLIC Superpixels," EPFL Technical Report 149300, Jun. 2010, pp. 1-15.

M. Van den Bergh and L. Van Gool, "Real-time stereo and flow-based video segmentation with superpixels," presented at the Applications of Computer Vision (WACV), 2012 IEEE Workshop on, Jan. 9, 2012, pp. 89-96.

F. Perbet and A. Maki, "Homogeneous Superpixels from Random Walks," presented at the Machine Vision Applications (MVA 2011), IAPR Conference on, Jun. 13, 2011, pp. 26-30.

Bartels et al.: Spatio-temporal tracking of material shape change via multi-dimensional splines; Publication Date: Jun. 24, 1994; SOURCE : Proceedings of the IEEE Workshop on Biomedical Image Analysis (Cat. No. 94TH0624-7), pp. 110-116.

Lezama et al.: Track to the future: Spatio-temporal video segmentation with long-range motion cues; Publication Date: Jun. 20, 2011; SOURCE : 2011 IEEE Conference on Computer Vision and Pattern Recognition (CVPR), pp. 3369-3376.

Ji et al.: Integration of motion fields through shape; Publication Date: Jun. 20, 2005; Computer Vision and Pattern Center for Automatic Research University of Maryland, pp. 1-7.

Pappas_An adaptive clustering algorithm for image segmentation; Publication Date: Aug. 6, 2002; Signal Processing, IEEE Transactions on (vol. 40 , Issue: 4 ) pp. 901-914.

Zhang_et al_Oversegment an image to get the candidate detection windows (only abstract available); SOURCE : Proceedings of the 2009 16th IEEE International Conference on Image Processing (ICIP 2009), p. 1.

Chang et al., "A Video Representation Using Temporal Superpixes", published Jun. 23-28, 2013, 22 pages.

Liu et al., "Entropy Rate Superpixel Segmentation", Mitsubishi Electric, published Jun. 20-25, 2011, 10 pages.

* cited by examiner

METHOD FOR SUPERPIXEL LIFE CYCLE MANAGEMENT

This application is a Continuation Application of Co-pending U.S. patent application Ser. No. 14/076,638, filed Nov. 11, 2013, which claims the benefit, under 35 U.S.C. §119 of European Patent Application No. 12306418.0, filed Nov. 15, 2012; European Patent Application No. 12306419.8, filed Nov. 15, 2012 and European Patent Application No. 13305157.3, filed Feb. 8, 2013 herein incorporated by reference.

FIELD OF THE INVENTION

The present invention relates to a method and an apparatus for generating temporally consistent superpixels for a video sequence. More specifically, the invention addresses life cycle management for superpixels associated to frames of a sequence of frames.

BACKGROUND OF THE INVENTION

Superpixel algorithms represent a very useful and increasingly popular preprocessing step for a wide range of computer vision applications, such as segmentation, image parsing, classification etc. Grouping similar pixels into so called superpixels leads to a major reduction of the image primitives. This results in an increased computational efficiency for subsequent processing steps, allows for more complex algorithms computationally infeasible on pixel level, and creates a spatial support for region-based features.

Superpixel algorithms group pixels into superpixels. As indicated in X. Ren et al.: "*Learning a classification model for segmentation*", IEEE International Conference on Computer Vision (ICCV) 2003, pp. 10-17, superpixels are local, coherent, and preserve most of the structure necessary for segmentation at scale of interest. As further stipulated in the above document, superpixels should be roughly homogeneous in size and shape. Though many superpixel approaches mostly target still images and thus provide only a limited or no temporal consistency at all when applied on video sequences, some approaches target video sequences. See, for example, O. Veksler et al.: "*Superpixels and Supervoxels in an Energy Optimization Framework*", in Computer Vision—ECCV 2010, vol. 6315, K. Daniilidis et al., Eds. Springer Berlin/Heidelberg, 2010, pp. 211-224, or A. Levinshtein et al.: "*Spatiotemporal Closure*", in Computer Vision—ACCV 2010, vol. 6492, R. Kimmel et al., Eds. Springer Berlin/Heidelberg, 2011, pp. 369-382. These approaches start to deal with the issue of temporal consistency.

SUMMARY OF THE INVENTION

It is an object of the present invention to further improve the handling of temporally consistent superpixels associated to frames of a sequence of frames.

According to the invention, a method for life cycle management of a superpixel associated to frames of a sequence of frames comprises the steps of:
 terminating the superpixel in a frame in case an area of the superpixel becomes smaller than a specified first value; and
 splitting the superpixel in the frame in case the area of the superpixel becomes larger than a specified second value.

Accordingly, an apparatus for life cycle management of a superpixel associated to frames of a sequence of frames comprises:
 a terminating unit configured to terminate the superpixel in a frame in case an area of the superpixel becomes smaller than a specified first value; and
 a splitting unit configured to split the superpixel in the frame in case the area of the superpixel becomes larger than a specified second value.

Similarly, a computer readable storage medium has stored therein instructions enabling life cycle management of a superpixel associated to frames of a sequence of frames, which when executed by a computer, cause the computer to:
 terminate the superpixel in a frame in case an area of the superpixel becomes smaller than a specified first value; and
 split the superpixel in the frame in case the area of the superpixel becomes larger than a specified second value.

According to the invention, a life-span, i.e. a duration, is determined for temporally consistent superpixels generated for video sequences. The duration is maximized without violating size and shape constraints. In general, the invention ensures a homogeneous size of the temporally consistent superpixels as superpixels that grow too large are split and superpixels that become too small are terminated. The maximized duration improves tracking of the superpixels, which in turn leads to a better scene and sequence understanding. The number of splits and terminations is preferably kept balanced, so that the number of superpixels per video frame is kept essentially constant. The decisions to split or terminate superpixels are based on information obtained from an analysis of the superpixels inside a sliding window that is shifted along the video volume.

Advantageously, in order to detect and correct a superpixel with an erroneous temporal consistency, the method further comprises the steps of:
 determining a similarity between an instance of the superpixel in a first frame and an instance of the superpixel in a later frame of the sequence of frames;
 comparing the determined similarity with a threshold; and
 replacing the superpixel in subsequent frames with a new temporally consistent superpixel in case the similarity is below the threshold.

Accordingly, the apparatus favorably further comprises:
 a determining unit configured to determine a similarity between an instance of the superpixel in a first frame and an instance of the superpixel in a later frame of the sequence of frames;
 a comparing unit configured to compare the determined similarity with a threshold; and
 a replacing unit configured to replace the superpixel in subsequent frames with a new temporally consistent superpixel in case the similarity is below the threshold.

A similarity check for the instances of a temporally consistent superpixel in a sliding window is introduced. The similarity between two or even more instances of a temporally consistent superpixel within the sliding window is determined. If it is below a certain threshold, the instances of the superpixel in all future frames of the sliding window are replaced by instances of a new temporally consistent superpixel starting at the first future frame. This approach provides a detection and start over strategy for superpixels with erroneous temporal consistency, which can be caused if the optical flow fails to provide a sufficiently reliable projection into the subsequent frame. Moreover, it provides a way to start over if there are sudden and disruptive changes in the video volume. Thus, it minimizes the distortion caused on subsequent processing steps by superpixels erroneously considered as temporally consistent. Thereby, it strengthens the flow of superpixels with a reliable temporal consistency.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

In the following a brief look at the creation of superpixels based on energy-minimizing clustering from a unified perspective is given. It is based on the methods described in R. Achanta et al.: "*SLIC superpixels compared to state-of-the-art superpixel methods*", IEEE Transactions on Pattern Analysis and Machine Intelligence, Vol. 34 (2012), pp. 2274-2282, G. Zeng et al.: "*Structure-sensitive superpixels via geodesic distance*", 2011 IEEE International Conference on Computer Vision (ICCV), pp. 447-454, and C. L. Zitnick et al.: "*Stereo for image-based rendering using image oversegmentation*", International Journal of Computer Vision, Vol. 75 (2007), pp. 49-65. The three methods conceive the generation of superpixels as a clustering problem. Image pixels are seen as data points in a multidimensional space, in which each dimension corresponds to a color channel or image coordinate of the pixels. Superpixels are represented by clusters in this multi-dimensional space, where each data point can only be assigned to one cluster. This data point assignment determines the oversegmentation.

In order to generalize these approaches, an energy function $E_{total}$ is defined, which sums up the energy $E(n,k)$ needed for all n∈N data points to be assigned to a cluster k∈K:

$$E_{total} = \sum_{n=1}^{N} E(n, s(n)), \qquad (1)$$

where N is the total number of pixels and the function s(·) returns the label k of the cluster to whom a data point is currently assigned. For a given number of clusters K, an optimal over-segmentation in terms of energy can be created by finding a constellation of clusters that minimizes $E_{total}$. The three methods primarily differ in the definition of the energy term $E(n,k)$.

In order to minimize the total energy function $E_{total}$, the approaches use the iterative Lloyd's algorithm, which converges to a locally optimal solution. After a grid-like initialization, each iteration is performed in two steps, the assignment-step and the update-step. In the assignment-step, each data point is assigned to the cluster for which the energy term has its minimum. Based on these assignments, the cluster center parameters are re-estimated in the update-step. The iteration of these two steps continues until no changes in the assignment-step are detected or a maximum number of iterations has been performed.

The method described by Zitnick et al. models the distribution of data points in a cluster as a multivariate Gaussian with mean vector $\mu_k$ and covariance matrix $\Sigma_k$. The energy term is defined to be inversely proportional to the probability of a data point n belonging to a cluster k:

$$E(n, k) \propto \frac{1}{\mathcal{N}(n | \mu_k, \Sigma_k)}. \qquad (2)$$

The distributions of color and position of the image pixels are assumed to be statistically independent. Therefore, the joint probability distribution can be factorized into the multiplication of two Gaussians (one for color and one for the spatial extent). In the iterative optimization scheme, the covariance matrices in the color space are held fixed, while the covariance matrices for the spatial extent are updated in each iteration.

A simplified version of the algorithm above is presented by R. Achanta et al. and called *SLIC superpixels*. In contrast to the approach by C. L. Zitnick et al., a fixed covariance matrix for color and spatial extent is assumed, whose elements outside of the main diagonal are zero. Moreover, the variances for the color dimensions are equal as well as the variances for the spatial extent. As the fixed covariances can be omitted, only the means of the Gaussians matter. This leads to an energy term $E(n,k)$ that is directly proportional to the distance $D(n,k)$ between a data point n and the center of cluster k:

$$E(n,k) \propto D(n,k). \qquad (3)$$

In R. Achanta et al. the following distance $D(n,k)$ between a data point n and the center of cluster k is introduced:

$$D(n, k) = \sqrt{d_{lab}^2(n, k) + \frac{m}{S} d_{xy}^2(n, k)}, \qquad (4)$$

where $d_{lab}(n,k)$ and $d_{xy}(n,k)$ are the Euclidean distances in CIELAB color space and image plane, respectively. The scaling factor m/S with $S=\sqrt{N/K}$ is due to the normalization of the two distances with respect to their maximum amplitude. The user-defined parameter m controls the trade-off between structure sensitivity and compactness of the generated superpixels.

In G. Zeng et al. the energy function $E_{total}$ is split up into two energy terms weighted by a trade-off factor λ, whose functionality is similar to m in equation (4). The first energy term depends on the geodesic distance between the data points and the center of their assigned cluster k, while the second term penalizes clusters and thus superpixels, whose areas deviate from the average area:

$$E_{total} = \sum_{n=1}^{N} E_{geo}(n, s(n)) + \lambda \sum_{k=1}^{K} E_{size}(k). \quad (5)$$

Using the geodesic distance allows to penalize color deviations along the path compared to a direct pixel comparison as used by R. Achanta et al.

As the spatial extent of the superpixels is limited a priori, it is sufficient in the assignment-step to search for pixels only in a limited search window around each cluster center. This leads to a significant reduction of the computational complexity. In order to enforce the spatial connectivity of the resulting segments, a post-processing step assigns split-off fractions, which are not connected to the main mass of the corresponding superpixel, to its nearest directly connected neighbor.

An improved approach for temporally consistent superpixels has recently been developed by the present inventors. It was inspired by the SLIC superpixels of R. Achanta et al. However, instead of introducing a temporal distance for the clustering in the video volume as done for the supervoxel approach of R. Achanta et al., which favors short-time consistency, the original 5D feature space for the superpixels is separated into a global color subspace comprising multiple frames and a local spatial subspace on frame level. The idea is that the color clustering is done globally and the spatial clustering locally. As a consequence, each temporally consistent superpixel has a single unified color center for all frames in scope and a separate spatial center for each frame. The latter one preserves the spatial locality on frame level and the former one ensures the temporal consistency. This approach is motivated by the observation that the color in a scene does not change rapidly in most cases. Therefore, the color of matching image regions and thus the mean colors of the associated superpixels is—in a first approximation—almost constant over multiple frames. In contrast, the positions can vary significantly depending on the motion in the scene.

Figure 1:
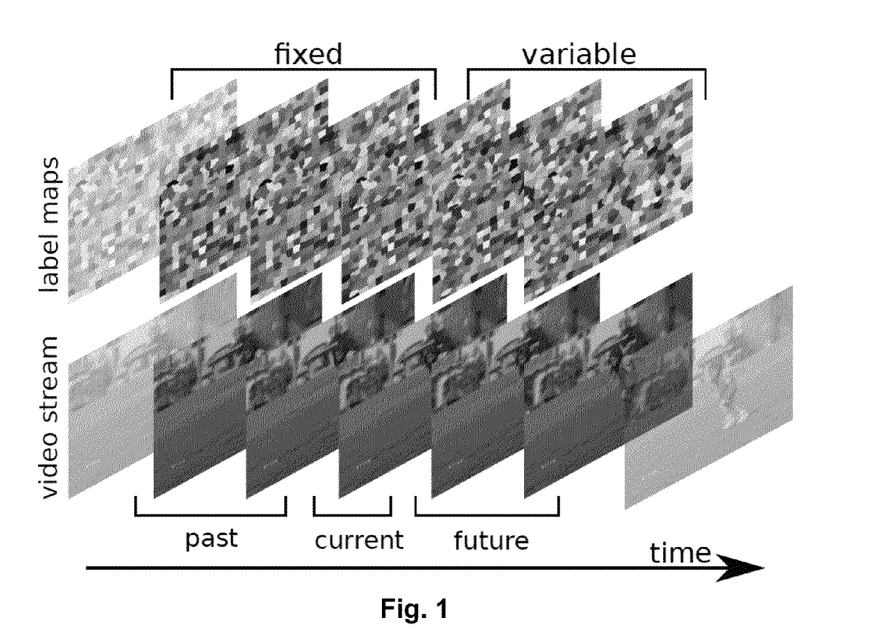
FIG. 1 illustrates a sliding window approach.

For the generation of temporally consistent superpixels for video sequences, a sliding window comprising W consecutive frames is shifted along the video volume frame by frame. A visualization of this sliding window with W=5 is illustrated in FIG. 1. The frame t is the current frame and for the depicted example it is in the center of the sliding window. For this frame, the superpixels are to be generated. The previous frames t−1 and t−2 are the so called past frames. Their superpixel segmentation is fixed and will not be altered anymore. However, as they are inside the sliding window, their superpixel segmentation influences the superpixel generation in the current frame as well as the future frames through the global color center, which is updated in each iteration of the optimization scheme. The future frames in the sliding window, i.e. t+1 and t+2 in the depicted example, also have an impact on the superpixel generation in the current frame. However, in contrast to the past frames their superpixel segmentation is not fixed and thus can change in each iteration. The future frames help to adapt to changes in the scene, whereas the past frames are conservative and try to preserve the global color center found. The number of future frames F and the number of past frames P, with W=F+P+1, is preferably specified by the user and can also be asymmetrical. The more the number of past frames that are used exceeds the number of future frames, the more conservative the update of the color center is. The more the number of future frames that are used exceeds the number of past frames, the more adaptive the update is. When the sliding window is shifted forward, the results of the frame that leaves the sliding window are saved and a new frame that enters the sliding window is read.

As an initialization, the spatial centers of the latest frame are projected onto the new frame entering the sliding window. A weighted average of the dense optical flow computed over all pixels assigned to this center is used. The projection of the centers also initializes the search windows, which are important to reduce the complexity. With this sliding window approach, the proposed superpixel algorithm is adaptive to changes in the video volume.

In general, the generated superpixels should not only be temporally consistent, but also have a maximum life-span within the video volume. The latter allows for a good identification of a temporally consistent superpixel over time and is a first step towards a long-term tracking.

The adaptation of the superpixel generation to the video content can lead to steadily shrinking or growing superpixels that tend to violate the constraint of a rather homogeneous size. Therefore, it has to be decided when superpixels are to be terminated or when they need to be split up. This is called the life-cycle-management of temporally consistent superpixels. In the present approach this is accomplished by tracing the pixel area that a superpixel occupies in the frames of the sliding window. Therefore, a termination and a splitting condition are defined, which are described in the following.

It is assumed that the decrease of the area is linear in the sliding window for shrinking superpixels. Based on this assumption the following termination condition is created:

$$A(k,t+F)+\rho_T \cdot \Delta A(k) \leq 0, \quad (6)$$

where $A(k,t+F)$ is the area of the superpixel k in the last future frame t+F of the sliding window, $\Delta A(k)$ is the slope of the area for superpixel k, and $\rho_T$ is a user-selected weighting parameter that can enforce or defer the termination. The slope $\Delta A(k)$ for F>1 is calculated as follows:

$$\Delta A(k) = \frac{A(k, t+F) - A(k, t+1)}{F-1}. \quad (7)$$

In principle, $\Delta A(k)$ could be calculated using area samples from multiple future frames. The termination of the superpixel is finally done in the following way. The spatial center of a terminated superpixel is removed from the last frame of the sliding window, i.e. the frame t+F. As a consequence no pixels will be assigned to this superpixel when this frame becomes the current frame. Instead, the pixels previously assigned to this superpixel will be assigned to the adjacent superpixels. For the example that will be described below, two future frames, i.e. F=2, and $\rho_T$=2 are used.

If F=1, $\Delta A(k)$ can be calculated using the only future frame and the current frame.

In order to prevent an unlimited growth, the following splitting condition is defined:

$$A(k,t+F)+\rho_S \cdot \Delta A(k) \geq \nu \cdot \overline{A}, \quad (8)$$

where $\overline{A}$ is the targeted average superpixel size, $\nu$ is a user-selected parameter that controls the allowed maximum deviation from the average size, and $\rho_S$ is a user-selected weighting parameter that can enforce or defer the splitting. For the example discussed below, $\nu$=1.5 and $\rho_S$=0.

If the splitting condition matches for a superpixel, two new superpixels are generated that replace this one. The replacement is done in the latest frame. While the global color center of the superpixel is copied, the two new spatial centers are shifted in opposite directions along the biggest eigenvector of the superpixel.

As the number of superpixels per frame should always match the user-defined value K, the last processing step of the life cycle management called superpixel balancing is applied after the terminations and splits. In order to keep the number of superpixels balanced, the difference δ between the number of terminations r and the number of splits σ should always be zero:

$$\delta = \tau - \sigma. \qquad (9)$$

If the difference δ in equation (9) is positive, the largest δ superpixels are split in the same way described above. Analogously, if δ is negative, the smallest δ superpixels are terminated. If δ happens to be zero, the system is already in balance.

In some cases the optical flow fails for an image region so that the image content covered by the superpixel in the previous frame is not in the projected search window anymore. Moreover, there could also be sudden and disruptive changes in the video volume. In order to make the approach robust against those rare cases, it is best to initiate a start over. Thus, the life-cycle management is advantageously complemented with an additional start-over condition. After the superpixels were generated for the current frame, a similarity check is applied. To this end, two instances of each temporally consistent superpixel are checked for similarity, one instance at frame t+F, i.e. the last frame of the sliding window, and the other instance at frame t−P, i.e. the first frame of the sliding window. For this similarity check different options are possible: histogram comparisons (e.g. chi-square test), feature and/or descriptor matching, color differences etc.

One implementation of such a similarity check is based on the following observation. Commonly, in those cases there is a significant difference in the average color of the superpixel k in the first frame t−P and the last frame t+F of the sliding window. If the Euclidean distance between the average colors differs more than a threshold Γ, superpixel k is replaced by a new one starting from frame t+1, i.e. the first future frame. Thereby, the local spatial centers are kept and a new global color center is introduced. The new color center is initialized with the average color of the replaced superpixel k for frame t+F. It was found that for the CIELAB color space Γ=30 provides a good balance between error detection and preservation.

Within the sliding window approach the iterative optimization procedure explained above can basically be maintained for clustering. For each current frame of the sliding window a number of I iterations is performed, applying the assignment- and update-steps. In the assignment-step, for each pixel in each frame of the sliding window the distances to the superpixel centers are calculated using equation (4). The color distance $d_{lab}$ is the Euclidean distance to the global color center, while $d_{xy}$ is the distance to the local spatial center on frame level. In the update-step, the new global color centers are calculated using the color values of those pixels in all frames of the sliding window, which are assigned to this superpixel. The spatial centers are updated per frame using only the image coordinates of the pixels that are assigned to this superpixel in the corresponding frame.

At the beginning the sliding window is empty. The first frame of a video sequence to enter the sliding window is initialized by seeding the cluster centers in a grid-like structure including seed perturbing. This frame is positioned at index t+F. The remaining frames of the video sequence are initialized as described above. It should be mentioned that with the proposed sliding window approach the present algorithm for temporally consistent superpixels is also capable of streaming and thus in principle enables real-time processing.

Figure 2:
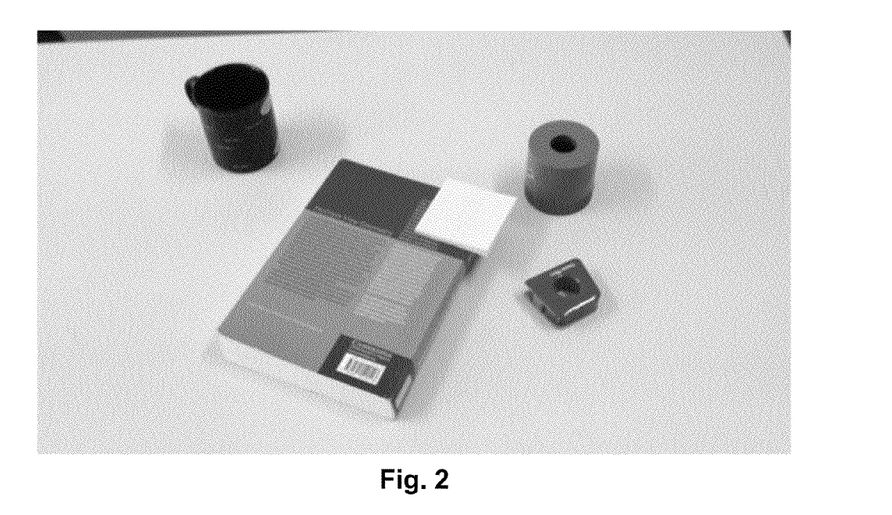
FIG. 2 shows image 5 of the so-called desk sequence.
Figure 3:
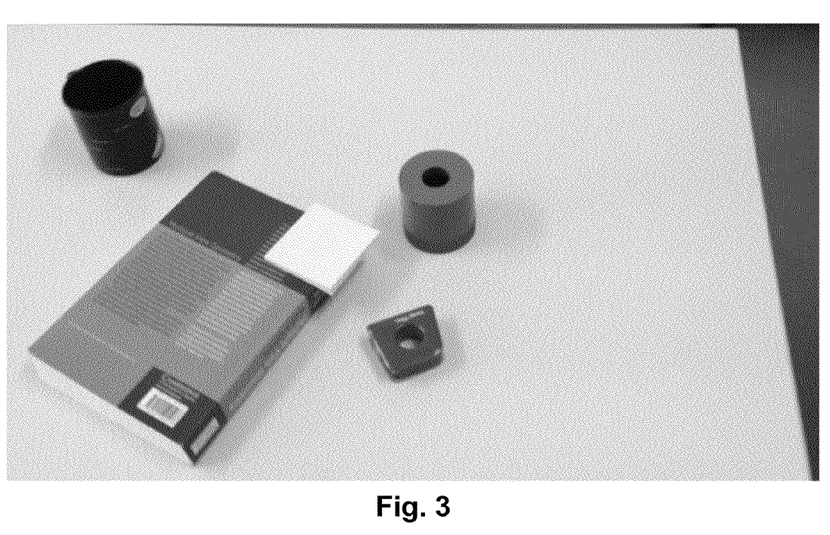
FIG. 3 shows image 40 of the so-called desk sequence.
Figure 4:
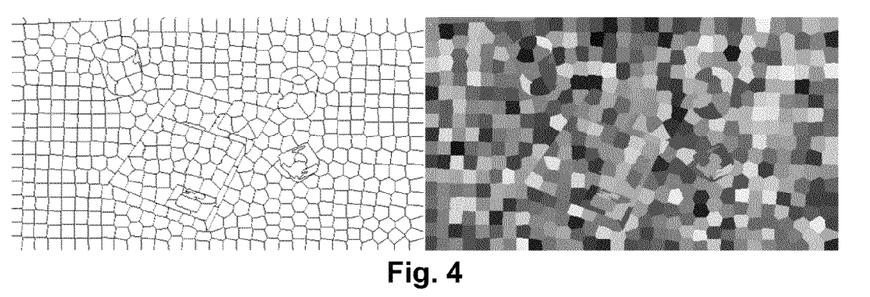
FIG. 4 depicts a contour image and a segment map for the image of FIG. 2 using life cycle management.
Figure 5:
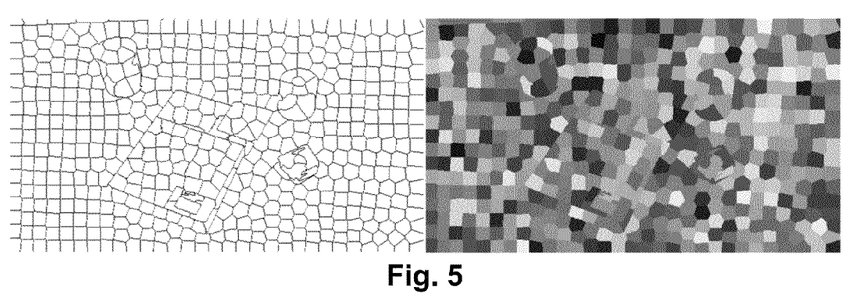
FIG. 5 depicts a contour image and a segment map for the image of FIG. 2 without life cycle management.
Figure 6:
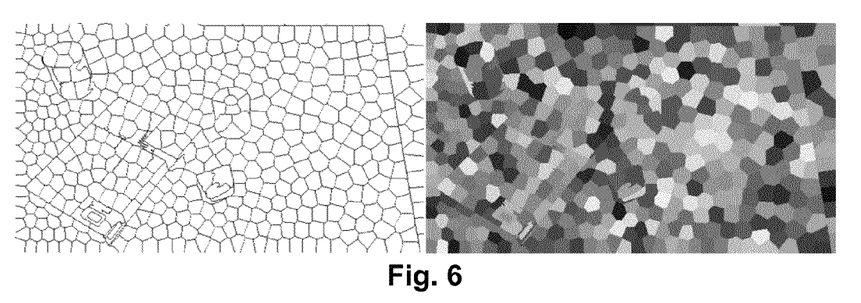
FIG. 6 shows a contour image and a segment map for the image of FIG. 3 using life cycle management.
Figure 7:
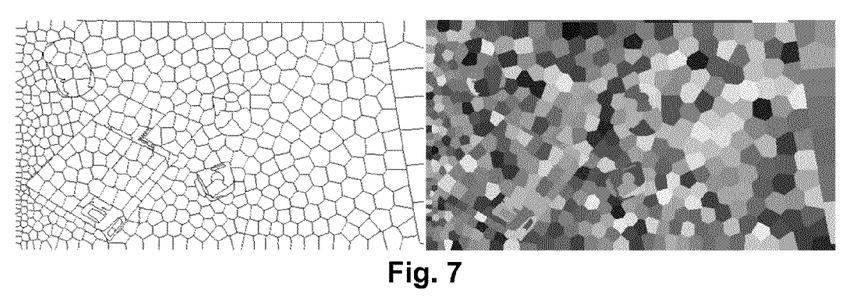
FIG. 7 shows a contour image and a segment map for the image of FIG. 3 without life cycle management.

In the following an example showing the benefits of the life cycle management (LCM) is given. FIGS. 2 and 3 depict two images from a video sequence, namely the images 5 and 40 of the so-called desk sequence, respectively. FIGS. 4 and 5 depict a contour map (left side) and a segment map for image 5 of the desk sequence generated with (FIG. 4) and without (FIG. 4) life cycle management. FIGS. 6 and 7 show the contour map and the segment map for image 40 of the desk sequence generated with (FIG. 6) and without (FIG. 7) life cycle management. While the results at the beginning of the sequence, i.e. for image 5, are almost identical, the differences between the two versions for image 40 are evident, especially at the left and the right side of the contour images and the segment maps.

In addition to the qualitative analysis of the life cycle management presented above, below some quantitate results are shown. For this, the Variance of Area (VoA) as well as the mean iso-perimetric quotient Q are used. The Variance of Area is an indicator for the homogeneity of size and is calculated as the variance of the superpixel's area normalized by the mean area. The iso-perimetric quotient $Q_k$ of a superpixel k is a measure for its similarity to a circle and thus a measure for the compactness. It is calculated as follows, where L(k) is the perimeter and A(k) the area of the superpixel k:

$$Q_k = \frac{4\pi A(k)}{L^2(k)}. \qquad (10)$$

The following Table 1 shows the results generated for the Desk sequence using K=512 superpixels. It is evident that the Variance of Area is significantly higher without the life cycle management, whereas Q is identical. The results below are an average over all frames of the sequence.

|  | VoA | Q |
| --- | --- | --- |
| WITHOUT LCM | 0.17 | 0.79 |
| WITH LCM | 0.08 | 0.79 |

Figure 8:
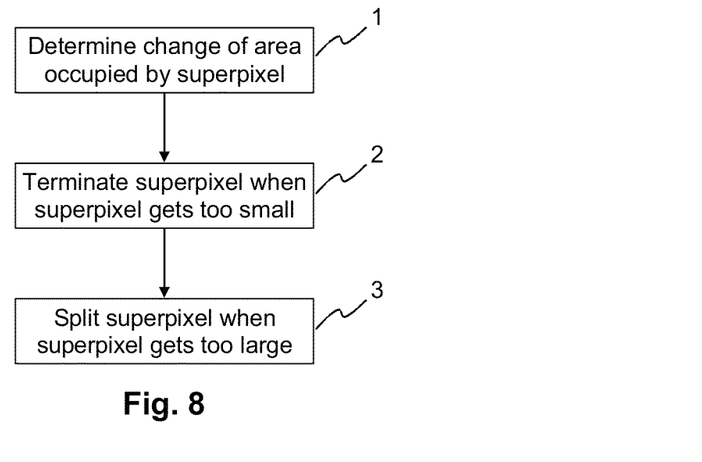
FIG. 8 schematically illustrates an implementation of a method for managing the life cycle of superpixels.

FIG. 8 schematically illustrates an implementation of a method for managing the life cycle of superpixels. In an optional first step a change of an area occupied by the superpixel between a current frame and a later frame of the sequence of frames is determined 1. In case the area of the superpixel becomes smaller than a specified first value, the superpixel is terminated 2 in the later frame. In case the area of the superpixel becomes larger than a specified second value, the superpixel is split 3 in the later frame.

Figure 9:
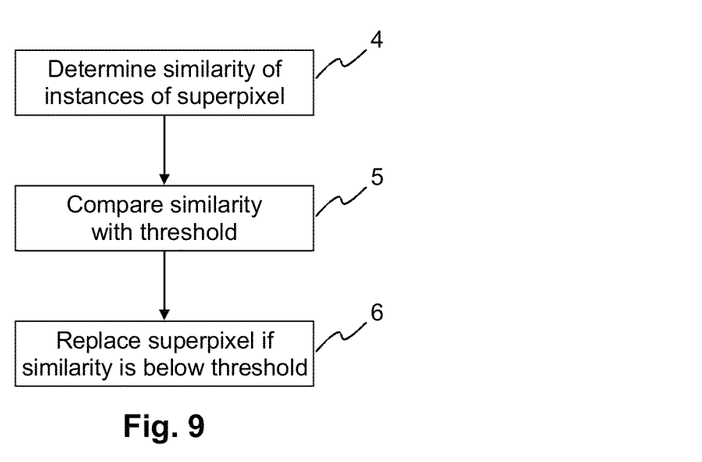
FIG. 9 schematically illustrates a method for detecting and correcting a superpixel with an erroneous temporal consistency.

FIG. 9 schematically illustrates a further aspect of life-cycle management, namely a method for detecting and correcting a superpixel with an erroneous temporal consistency. A similarity between an instance of the superpixel in a first frame and an instance of the superpixel in a later frame of the sequence of frames is determined 4. The determined similarity is then compared 5 with a threshold. In case the similarity is below the threshold, the superpixel is replaced 6 with a new temporally consistent superpixel in subsequent frames.

Figure 10:
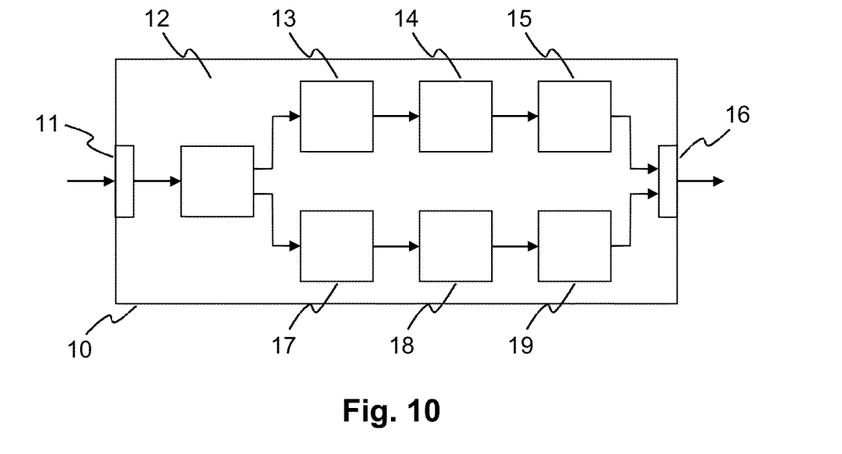
FIG. 10 depicts an apparatus configured to implement the methods of FIG. 8 and FIG. 9.

An apparatus 10 configured to perform the methods of FIG. 8 and FIG. 9 is schematically depicted in FIG. 10. The apparatus 10 has an input for receiving a sequence of frames and a processing unit 12 for generating superpixels for the received frames. A comparing unit 13 is configured to determine 1 a change of an area occupied by the superpixel between a current frame and a later frame of the sequence of frames. A terminating unit 14 is configured to terminate 2 the superpixel in the later frame in case the area of the superpixel becomes smaller than a specified first value. Also, a splitting unit 15 is configured to split 3 the superpixel in the later frame in case the area of the superpixel becomes larger than a specified second value. Preferably the apparatus 10 further comprises a determining unit 16, which is configured to determine 4 a similarity between an instance of the superpixel in a first frame and an instance of the superpixel in a later frame of the sequence of frames. A further comparing unit 17 is configured to compare 5 the determined similarity with a threshold. Also provided is a replacing unit 18, which is configured to replace 6 the superpixel in subsequent frames with a new temporally consistent superpixel in case the similarity is below the threshold. In any case the resulting superpixels are output via an output 19. Of course, two or more of the various units may likewise be combined into single unit.

The invention claimed is:

1. A method for life cycle management of superpixels associated with frames of a sequence of frames, the method comprising:
   receiving a sequence of frames;
   generating superpixels for frames of the sequence of frames;
   in the event an area of one of the superpixels in one of the frames becomes smaller than a specified first value, terminating said superpixel;
   in the event an area of one of the superpixels in one of the frames becomes larger than a second specified value, splitting said superpixel by replacing said superpixel with two new superpixels; and
   processing the superpixels to transmit them to an image processing device.

2. The method according to claim 1, further comprising balancing a number of said terminations of said superpixels and splits of said superpixels in order to keep a number of said superpixels per frame substantially constant.

3. The method according to claim 1, further comprising:
   determining a similarity between an instance of a superpixel in a first frame and an instance of said superpixel in a later frame of the sequence of frames;
   comparing the determined similarity with a threshold; and
   in the event the similarity is below the threshold, replacing said superpixel in subsequent frames with a new superpixel.

4. The method according to claim 1, wherein for generating the two new superpixels a global color center of the superpixel to be replaced is copied and two new spatial centers are determined by shifting a spatial center of the superpixel to be replaced in opposite directions along a biggest eigenvector of said superpixel.

5. An apparatus for life cycle management of superpixels associated with frames of a sequence of frames, wherein the apparatus comprises:
   an input configured to receive a sequence of frames;
   a processing unit configured to generate superpixels for frames of the sequence of frames, to terminate a superpixel in the event an area of said superpixel in one of the frames becomes smaller than a specified first value, to split a superpixel by replacing said superpixel with two new superpixels in the event an area of said superpixel in one of the frames becomes larger than a second specified value, and to process the superpixels to transmit them to an image processing device; and
   an output configured to output the processed superpixels.

6. The apparatus according to claim 5, wherein the processing unit is configured to balance a number of said terminations of said superpixels and splits of said superpixels in order to keep a number of said superpixels per frame substantially constant.

7. The apparatus according to claim 5, further comprising:
   a determining unit configured to determine a similarity between an instance of a superpixel in a first frame and an instance of said superpixel in a later frame of the sequence of frames;
   a comparing unit configured to compare the determined similarity with a threshold; and
   a replacing unit configured to replace said superpixel in subsequent frames with a new superpixel in the event the similarity is below the threshold.

8. The apparatus according to claim 5, wherein for generating the two new superpixels the processing unit is configured to copy a global color center of the superpixel to be replaced and to determine two new spatial centers by shifting a spatial center of the superpixel to be replaced in opposite directions along a biggest eigenvector of said superpixel.

9. A computer readable non-transitory storage medium having stored therein instructions enabling life cycle management of superpixels associated with frames of a sequence of frames, which when executed by a computer, cause the computer to:
   receive a sequence of frames;
   generate superpixels for frames of the sequence of frames;
   in the event an area of one of the superpixels in one of the frames becomes smaller than a specified first value, terminate said superpixel;
   in the event an area of one of the superpixels in one of the frames becomes larger than a second specified value, split said superpixel by replacing said superpixel with two new superpixels; and
   process the superpixels to transmit them to an image processing device.

10. The computer readable non-transitory storage medium according to claim 9, wherein the instructions further cause the computer to balance a number of said terminations of said superpixels and splits of said superpixels in order to keep a number of said superpixels per frame substantially constant.

11. The computer readable non-transitory storage medium according to claim 9, wherein the instructions further cause the computer to:
   determine a similarity between an instance of a superpixel in a first frame and an instance of said superpixel in a later frame of the sequence of frames;
   compare the determined similarity with a threshold; and
   in the event the similarity is below the threshold, replace said superpixel in subsequent frames with a new superpixel.

12. The computer readable non-transitory storage medium according to claim 9, wherein for generating the two new superpixels the instructions cause the computer to copy a global color center of the superpixel to be replaced and to determine two new spatial centers by shifting a spatial center of the superpixel to be replaced in opposite directions along a biggest eigenvector of said superpixel.

* * * * *